US009365332B2

(12) United States Patent
Jentis et al.

(10) Patent No.: US 9,365,332 B2
(45) Date of Patent: Jun. 14, 2016

(54) DISPENSING APPARATUS HAVING AN OVERCAP AND SCOOP

(75) Inventors: Richard Seth Jentis, Bridgewater, NJ (US); Jason Billig, Mount Vernon, NY (US); Stuart Leslie, Larchmont, NY (US); Daniel Taek Kim, Washington Township, NJ (US); Roland Zeder, New York, NY (US); Elisa Partosoedarso Malani, Saratoga, CA (US); Timm Lee Dupuis, Meomonie, WI (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/519,673

(22) PCT Filed: Jul. 12, 2010

(86) PCT No.: PCT/US2010/041639
§ 371 (c)(1),
(2), (4) Date: May 23, 2013

(87) PCT Pub. No.: WO2011/081677
PCT Pub. Date: Jul. 7, 2011

(65) Prior Publication Data
US 2014/0131355 A1    May 15, 2014

Related U.S. Application Data

(60) Provisional application No. 61/290,531, filed on Dec. 29, 2009.

(51) Int. Cl.
*B65D 47/20*   (2006.01)
*B65D 43/16*   (2006.01)
(Continued)

(52) U.S. Cl.
CPC .............. *B65D 47/20* (2013.01); *B65D 43/169* (2013.01); *B65D 51/246* (2013.01); *G01F 19/002* (2013.01)

(58) Field of Classification Search
CPC .......... B44D 3/12; B44D 3/123; B65D 47/20; B65D 43/169; B65D 51/246; B65D 77/245; A47J 43/287; A47J 43/28
USPC .............. 206/212, 735, 574.1, 697; 248/37.3, 248/213.2, 110, 113; 220/212, 735, 574.1, 220/697, 736
See application file for complete search history.

(56) References Cited

U.S. PATENT DOCUMENTS 2,555,053 A * 5/1951 Myrick et al. ................. 248/113
4,121,798 A * 10/1978 Schumacher et al. ........ 248/113
(Continued)

FOREIGN PATENT DOCUMENTS

FR    2747107    10/1997
GB    2390599    1/2004
(Continued)

OTHER PUBLICATIONS

International Search Report and Written Opinion from priority PCT Application No. PCT/US2010/041639 dated Aug. 24, 2010.

*Primary Examiner* — Steven A. Reynolds
(74) *Attorney, Agent, or Firm* — Dr. Gary M. Lobel, Esq.

(57) ABSTRACT

Dispensing apparatuses (10) for administering particulate materials are presented. In an embodiment, the present disclosure provides a dispensing apparatus (10) including an overcap (30) having a lid (32) having an attachment mechanism (50) connected to a portion of a surface of the lid and rim (34) hingedly attached to the lid and comprising a gripper (60) constructed and arranged to hold a scoop (20). The scoop can be releasably attached to the lid and the rim of the overcap in a variety of ways.

14 Claims, 4 Drawing Sheets

(51) Int. Cl.
    *B65D 51/24*      (2006.01)
    *G01F 19/00*      (2006.01)

(56) References Cited

U.S. PATENT DOCUMENTS

| | | | | |
|---|---|---|---|---|
| 4,890,807 | A * | 1/1990 | Desjardins | 248/146 |
| 5,683,009 | A * | 11/1997 | King | 220/696 |
| 5,706,974 | A * | 1/1998 | Murdick et al. | 220/735 |
| 6,283,345 | B1 * | 9/2001 | Butschat | 224/148.4 |
| D459,848 | S * | 7/2002 | Anderson | D32/54 |
| 6,616,110 | B1 * | 9/2003 | McIntee | 248/213.2 |
| 6,871,825 | B2 * | 3/2005 | Song | 248/113 |
| 8,042,704 | B2 | 10/2011 | Borowski et al. | 220/574.1 |
| 8,376,179 | B2 * | 2/2013 | Horton et al. | 220/735 |
| 8,469,223 | B2 * | 6/2013 | Perry et al. | 220/608 |
| 8,590,732 | B2 * | 11/2013 | Vandamme et al. | 220/735 |
| 8,627,981 | B2 * | 1/2014 | Perry et al. | 220/657 |
| 8,727,149 | B1 * | 5/2014 | Reid et al. | 215/228 |
| 2003/0121925 | A1 * | 7/2003 | Mowe | 220/736 |
| 2004/0099566 | A1 * | 5/2004 | Kipperman et al. | 206/541 |
| 2005/0173467 | A1 * | 8/2005 | Pickering, Jr. | 222/460 |
| 2006/0156811 | A1 * | 7/2006 | Borowski et al. | 73/426 |
| 2007/0102061 | A1 * | 5/2007 | Tsao | 141/380 |
| 2008/0041861 | A1 * | 2/2008 | Crawford et al. | 220/697 |
| 2008/0156806 | A1 * | 7/2008 | Perry et al. | 220/361 |
| 2008/0156808 | A1 * | 7/2008 | Perry et al. | 220/560.03 |
| 2008/0173657 | A1 * | 7/2008 | Perry et al. | 220/810 |
| 2009/0032545 | A1 * | 2/2009 | Zeiler et al. | 220/833 |
| 2010/0308065 | A1 * | 12/2010 | Vandamme et al. | 220/697 |
| 2011/0186570 | A1 * | 8/2011 | Perry et al. | 220/23.87 |
| 2012/0279964 | A1 * | 11/2012 | McGeough | 220/212 |
| 2013/0081364 | A1 * | 4/2013 | Piscopo | 53/492 |
| 2014/0097183 | A1 * | 4/2014 | McGrath et al. | 220/212 |
| 2014/0151389 | A1 * | 6/2014 | Melia | 220/796 |

FOREIGN PATENT DOCUMENTS

| | | |
|---|---|---|
| WO | 2005075314 | 8/2005 |
| WO | 2008083141 | 7/2008 |

* cited by examiner

DISPENSING APPARATUS HAVING AN OVERCAP AND SCOOP

BACKGROUND

The present disclosure generally relates to dispensing apparatuses. More specifically, the present disclosure relates to containers, overcaps, scoops and apparatuses having same.

Covered containers holding particulate, granular or powdered materials are commonly known. Examples of such containers include powdered infant formula and coffee. Typically these containers do not come with any individual piece of dispensing equipment. A user generally opens the container and uses a household item such as a cup or a spoon for administering the contents thereof.

Occasionally containers holding particulate or powder products will provide their own dispensing equipment such as a spoon or small cup. Unfortunately, the dispensing cup is found lying in and covered with the powder materials. While retrieving the cup, the user gets the powder on his or her hands. In certain circumstances, the dispensing cup may settle to the bottom of the container over time or during transportation. The user is then forced to dig through the powder or pour out the contents of the container to find the dispensing cup, which may result in contamination of the product. Moreover, when the user is done removing the desired quantity of powder, the cup is placed back into the container and the same problems arise again the next time the container is used.

Some containers attach a dispensing cup to the cover of the container. However, once the container is opened, the user encounters the same problems of storing the dispensing cup within the powder materials, leading to hygiene problems. There are no known solutions for storing the dispensing cup in a manner that avoids contamination and while providing ease of use after the dispensing cup is first detached. Therefore, there remains a need for easy attachment of the dispensing cup before first use as well as during subsequent uses of a product.

SUMMARY

The present disclosure relates to dispensing apparatuses including overcaps and scoops. In a general embodiment, the present disclosure provides a dispensing apparatus including an overcap having a lid having an attachment mechanism on a portion of a surface of the lid. The overcap also includes a rim hingedly attached to the lid and including a gripper constructed and arranged to receive a scoop. The scoop can be releasably attached to the lid and the rim of the overcap in a variety of ways.

In an embodiment, the attachment mechanism includes a first support member, a second support member and a snap peg positioned between the first support member and the second support member. In another embodiment, the attachment mechanism includes a support member and a snap post.

In an embodiment, the lid defines at least one raised curve member. In an embodiment, the gripper includes a curved portion constructed and arranged to partially surround the scoop. The curved portion can include one or more protrusions.

In an embodiment, the rim is constructed and arranged to be attached to a container. In another embodiment, the lid includes a first locking member and the rim includes a second locking member that attaches to the first locking member.

In an embodiment, the dispensing apparatus includes a scoop including a handle and a cup attached to the handle. A portion of the cup can define one or more apertures. A portion of the handle can include one or more guiding members.

In another embodiment, the present disclosure provides a storage device for administrating particulate material. The storage device includes a scoop having a cup and a handle attached to the cup, an overcap having a lid having an attachment mechanism on a portion of a surface of the lid and a rim hingedly attached to the lid and including a gripper constructed and arranged to receive or hold the scoop, and a container attached to the rim of the overcap. The container can include a recessed gripping portion.

In an alternative embodiment, the present disclosure provides a method of dispensing a product. The method comprises providing a storage device including an overcap having a lid having an attachment mechanism attached to a portion of a surface of the lid and a scoop attached to the attachment mechanism, a rim hingedly attached to the lid and including a gripper constructed and arranged to receive or hold the scoop, and a container attached to the rim of the overcap and holding a product. The method further comprises opening the lid and removing the scoop from the attachment mechanism. The scoop can be used to remove product from the storage device. The scoop can be inserted into the gripper for easy access the next time the product needs to be removed and dispensed.

An advantage of the present disclosure is to provide a dispensing apparatus that is convenient and easy to use.

Another advantage of the present disclosure is to provide an overcap for a container and a scoop readily attachable to a lid of the overcap.

Yet another advantage of the present disclosure is to provide a storage device for holding particulates or powders whereby users can easily find and retrieve a scoop without contaminating their hands with the particulates.

Still another advantage of the present disclosure is to provide a dispensing apparatus for particulate material that prevents or minimizes potential contamination of the material by the user.

Additional features and advantages are described herein, and will be apparent from, the following Detailed Description and the figures.

DETAILED DESCRIPTION

The present disclosure relates to dispensing apparatuses and methods of using same. More specifically, the present disclosure relates to overcaps and scoops for dispensing, administering or proportioning suitable particulate, granular and powder materials from containers storing same. The powder materials can be any of a variety of dispensable materials, for example, baby formula, powdered beverages, flour, coffee, sugar, etc. It should be appreciated that the present disclosure can be adapted for dispensing or administering liquids or viscous materials as well.

Figure 1:
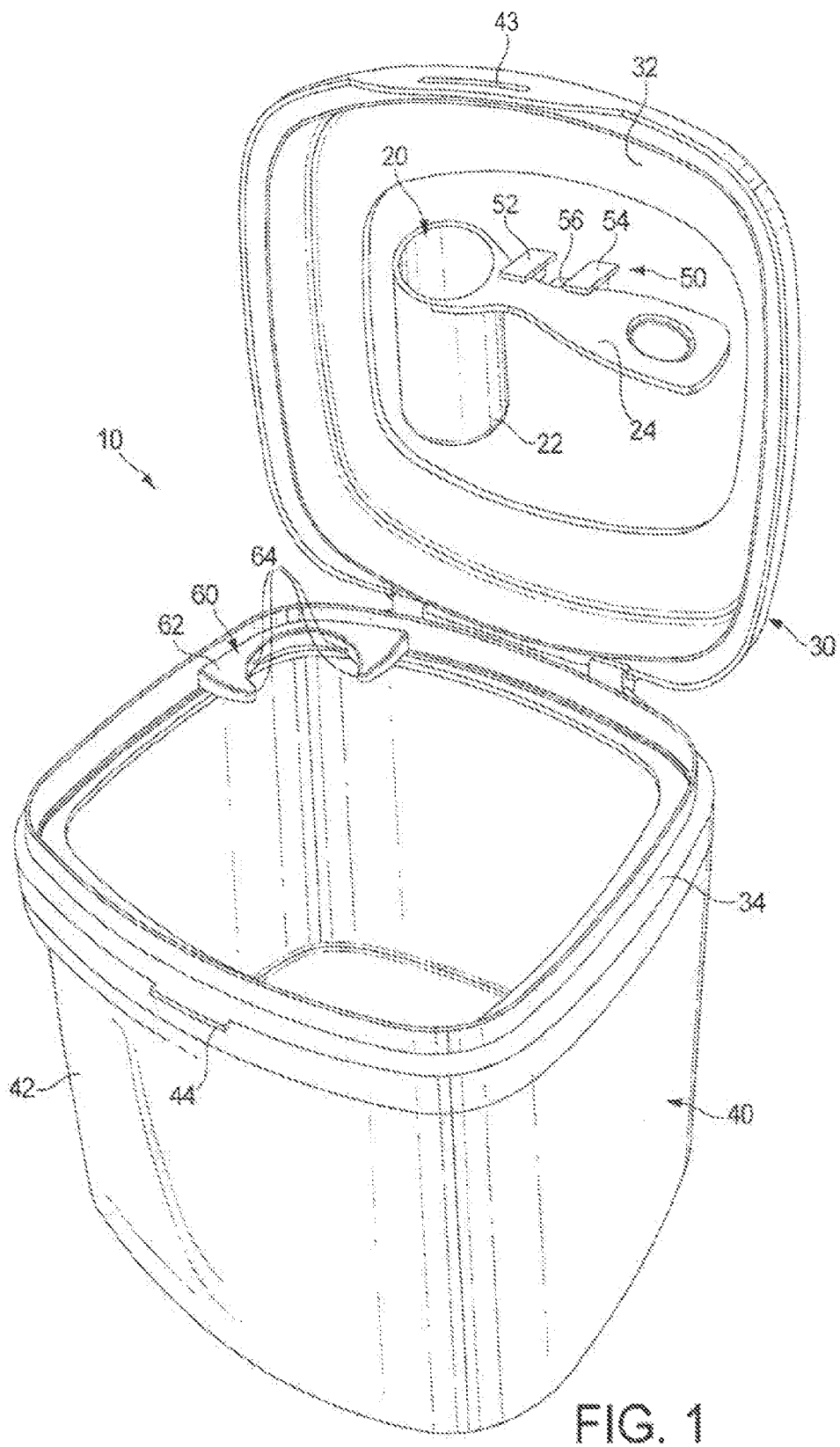
FIG. 1 shows a perspective view of the dispensing apparatus with the scoop connected to the attachment mechanism on the lid in an embodiment of the present disclosure.
Figure 2:
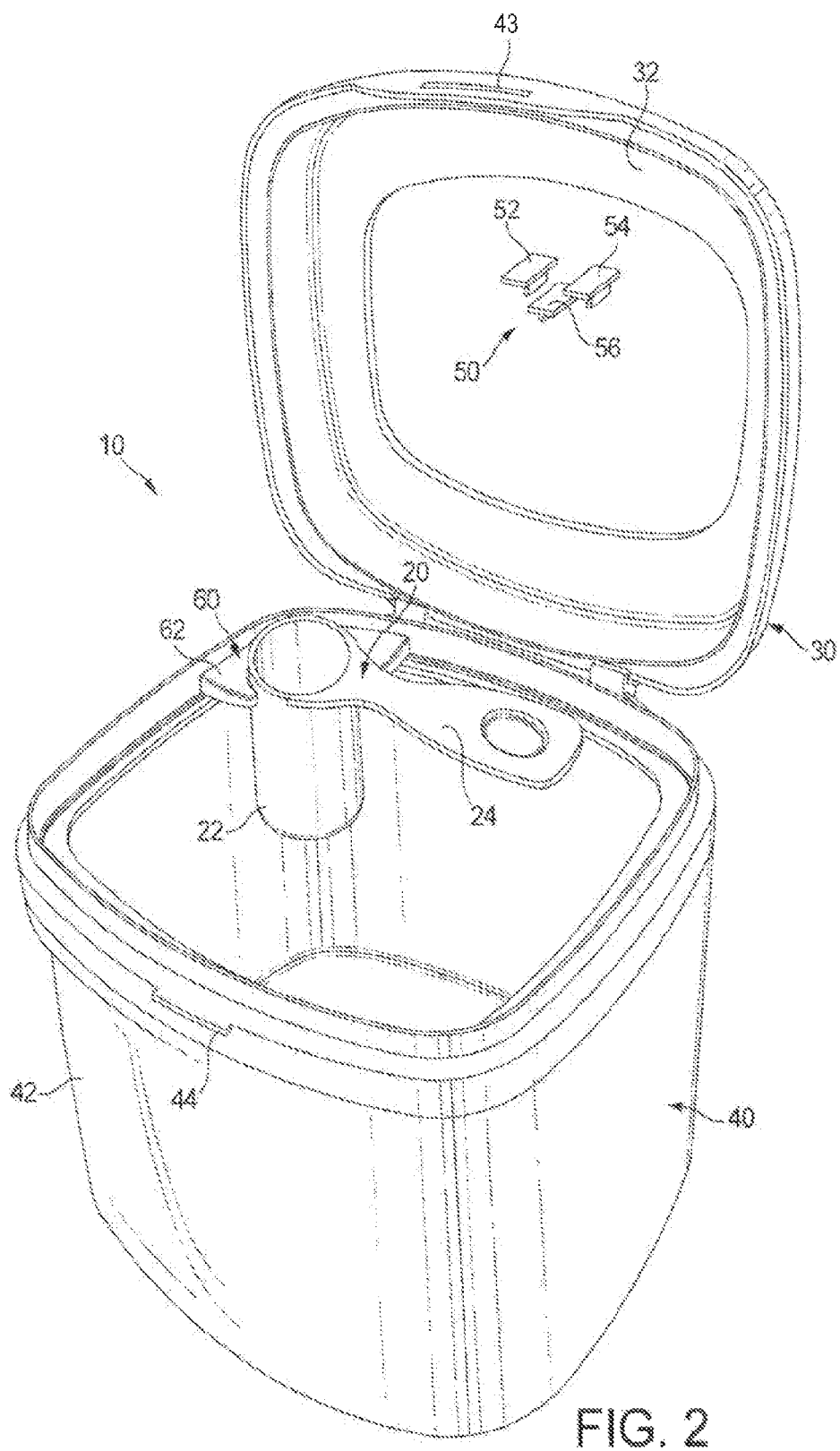
FIG. 2 shows a perspective view of the dispensing apparatus with the scoop connected to the gripper on the rim in an embodiment of the present disclosure.

In a general embodiment illustrated in FIGS. 1-2, the present disclosure provides a dispensing apparatus 10 for administrating particulate material. Dispensing apparatus 10 includes a scoop 20 and an overcap 30. A container 40 can be attached to overcap 30 in any suitable manner.

Container 40 can have any suitable shape for holding a product such as a powder or particulate material. Container 40 can include a recessed gripping portion 42. Recessed gripping portion 42 can be any suitable shape that makes it easier for a consumer to grip or hold container 40. Any part of recessed gripping portion may further include a textured surface.

Scoop 20 includes a cup 22 and a handle 24 attached to cup 22. Handle 22 can include any suitable shape that allows a consumer to grasp when holding scoop 20. Cup 22 can be any suitable shape for hold a material stored in container 40. Cup 22 and handle 24 can be formed as a single integral scoop 20 or be separate components that are attached together.

Overcap 30 includes a lid 32 having an attachment mechanism 50 attached or connected to a portion of a surface of lid 32. Attachment mechanism 50 can be integrated on lid 32 as part of a single unit and made from the same material as lid 32. Overcap 30 further includes a rim 34 that can be hingedly attached to lid 32. Lid 32 can be any suitable shape for covering container 40. Lid 32 can include a first locking member 43 that attaches or interlocks with a second locking member 44 on rim 34. As a result, lid 32 can be tightly secured to rim 34 when lid 32 is in the closed position.

Rim 34 includes a gripper 60 constructed and arranged to receive or hold scoop 30. Rim 34 can be constructed and arranged to be attached to the top of container 40 in any suitable manner. For example, rim 34 can have the same shape as the top portion of container 40 and can be snap-fitted on to the top of container 40 or rotated/screwed onto the top portion of container 40 using an interlocking threading portion on rim 34 and container 40.

Although FIGS. 1-2 show gripper 60 in one corner of rim 34, it should be appreciated that gripper 60 can be positioned along any portion of rim 34 including the sides of rim 34. Preferably, gripper is positioned at a location where it does not contact any part of scoop 20 when scoop 20 is connected to attachment mechanism 50 and lid 32 is closed.

As seen in the embodiment illustrated in FIGS. 1-2, attachment mechanism 50 includes a first support member 52, a second support member 54 and a snap peg 56 positioned between first support member 52 and second support member 54. In this configuration, attachment mechanism 50 connects to a portion of handle 24 near cup 22 of scoop 20 to lid 32. First support member 52 and second support member 54 press handle 24 against snap peg 56 as seen in FIG. 1 to tightly secure scoop 30 to lid 32 during storage or handling of container 40.

As further seen in the embodiment illustrated in FIG. 2, gripper 60 can hold scoop 30, for example, once container 40 has been opened. In this configuration, gripper 60 extends from rim 34 and includes a curved portion 62 constructed and arranged to partially surround cup 22 of scoop 20. Curved portion 62 can include one or more protrusions 64 that can further press against cup 22 to hold cup 22 firmly in place. It should be appreciated that curved portion 62 can include any suitable shape and preferably is shaped to match the outer contour of cup 22.

Figure 3A:
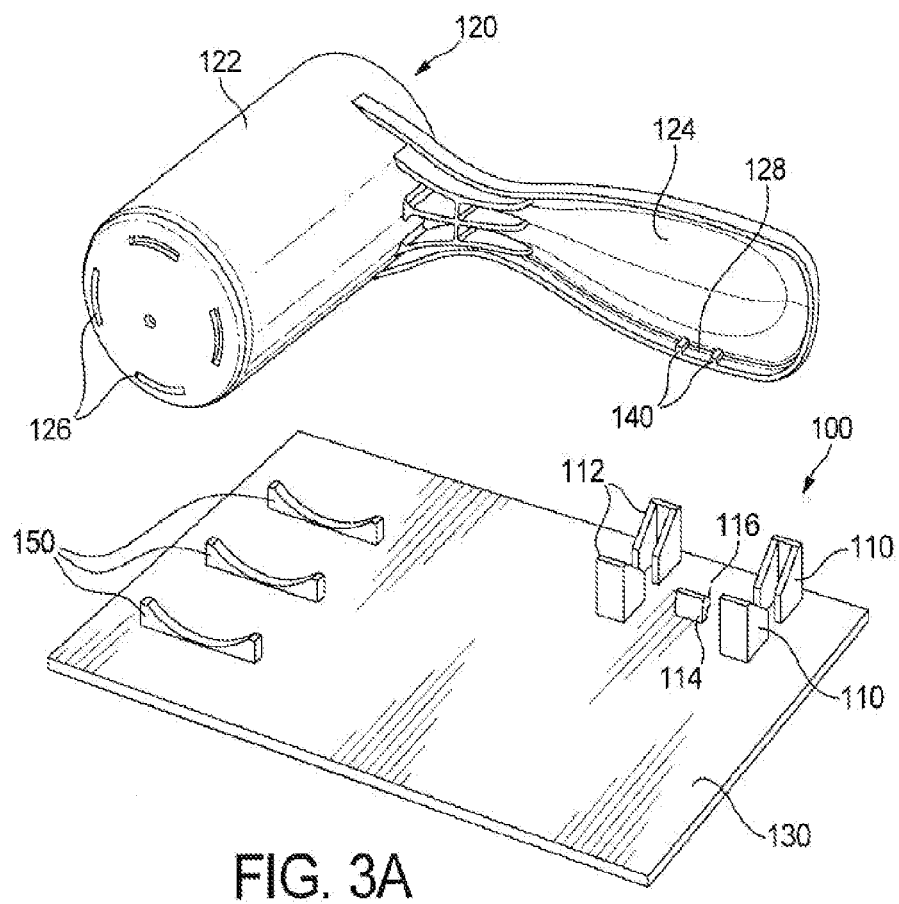
FIGS. 3A-3B show a perspective view of the attachment mechanism in a second embodiment of the present disclosure.
Figure 3B:
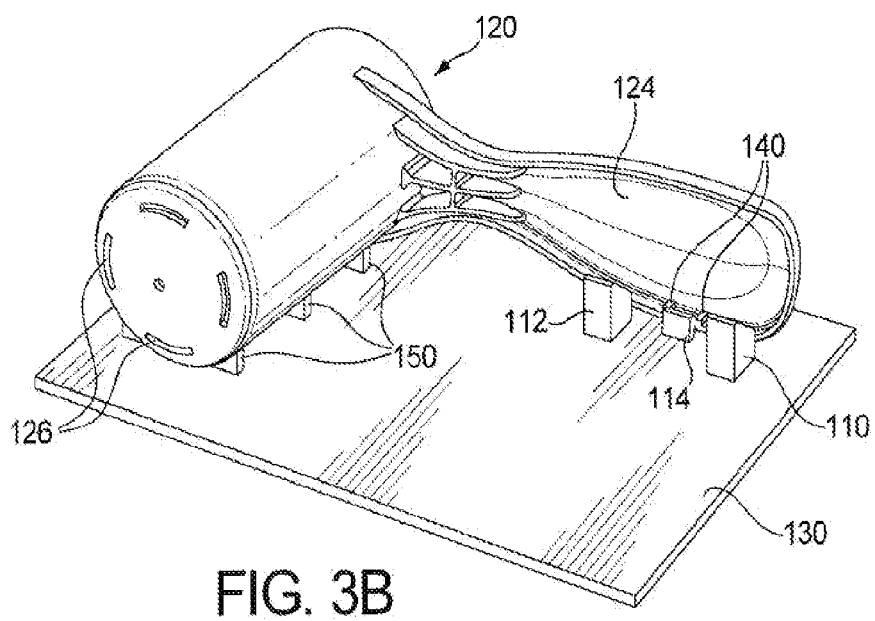

In another embodiment illustrated in FIGS. 3A-3B, an attachment mechanism 100 includes a first support member 110, a second support member 112 and a snap peg 114 positioned between first support member 110 and second support member 112. Snap peg 114 has a snap mechanism 116. In this configuration, attachment mechanism 100 connects to a portion of handle 124 away from cup 122 of scoop 120 to a portion of lid 130. Handle 124 is positioned between first support member 110 and second support member 112. First support member 110 and second support member 112 press handle 124 against snap peg 114, which can interlock with an edge 128 of handle 124 via snap mechanism 116.

A portion of the handle 124 can include one or more guiding members 140. Guiding members 140 can be sized to have snap peg 114 fit between them. As a result, guiding members 140 assist in aligning handle 124 to fit onto snap peg 114 in a position that best secures scoop 120 to the portion of lid 130.

As shown in FIGS. 3A-3B, a portion of lid 130 can define one or more raised curve members 150 that support cup 122 of scoop 120 when scoop 120 is connected to attachment mechanism 100. As a result, the raised curve members 150 can assist attachment mechanism 100 in securing scoop 120 to the portion of lid 130. It should be appreciated that raised curve members 150 can be any suitable shape that matches the contours of cup 122.

As further seen in FIGS. 3A-3B, a portion of cup 122 can define one or more apertures 126. Apertures 126 can have any suitable size or shape that allow air to pass through, but retain material within cup 122. For example, apertures 126 can be elongated slots that allow air to pass through, but retain material that is scooped out of the container by scoop 120. This reduces or minimizes the amount of air that may be in the material held in cup 122, which increases the accuracy of the amount of the material that is scooped. Cup 122 can also include measurement or unit markings to assist a user in determining how much material is held in cup 122. It should be appreciated that the cup in any embodiments of the present disclosure can include one or more apertures.

Figure 4A:
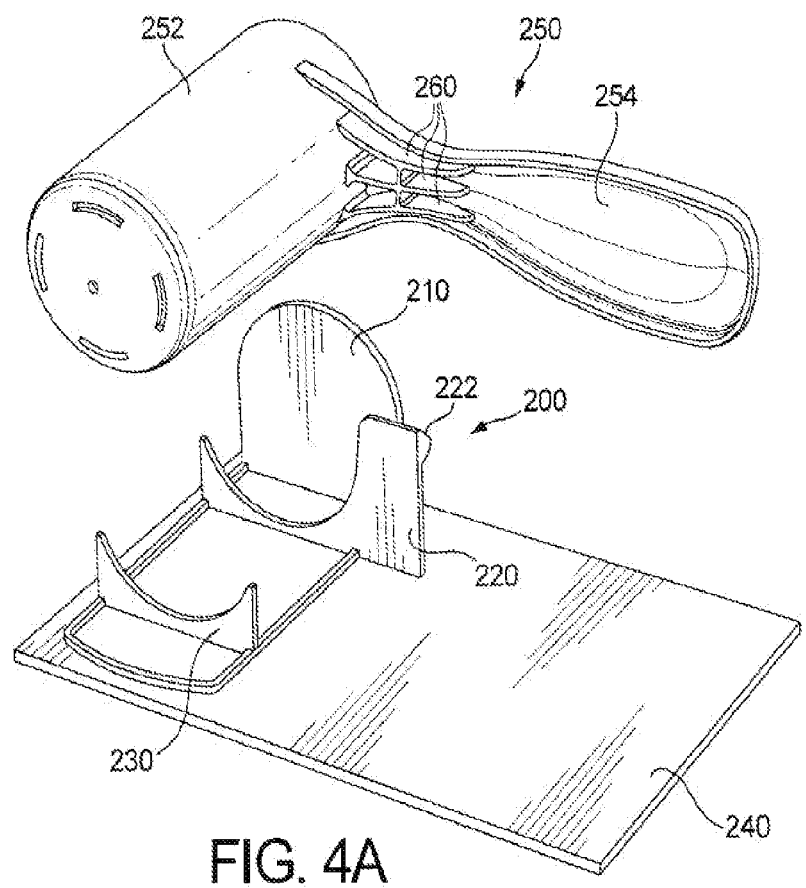
FIGS. 4A-4B show a perspective view of the attachment mechanism in a third embodiment of the present disclosure.
Figure 4B:
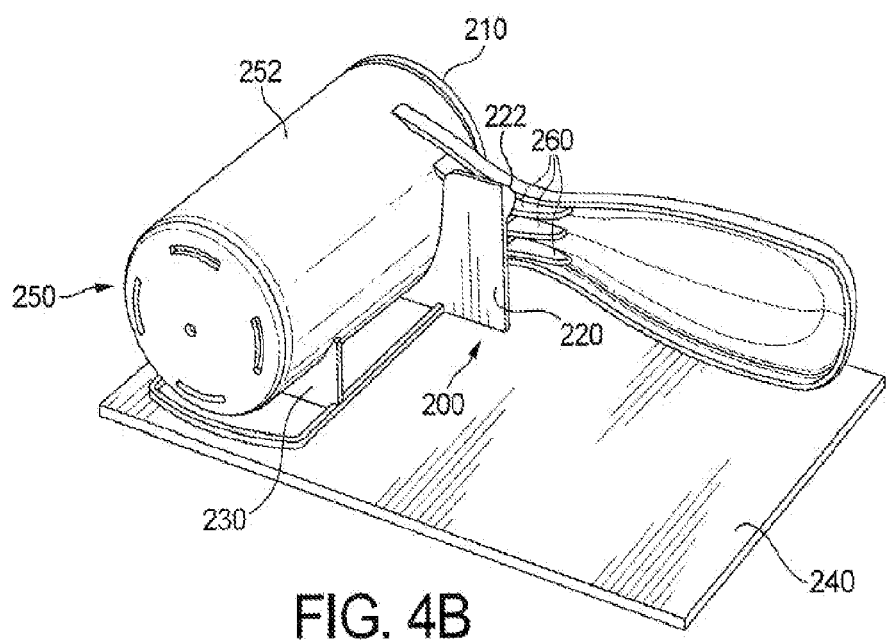

In an alternative embodiment show in FIGS. 4A-4B, an attachment mechanism 200 includes a support member 210 and a snap post 220 having a snap mechanism 222. Support member 210 can be sized to cover the opening of cup 252 of scoop 250. One or more raised curve members 230 can also be attached to a portion of lid 240. In this configuration, attachment mechanism 200 encompasses cup 252 of scoop 252 and attaches a portion of handle 254 near cup 252 to lid 240. Support member 210 presses handle 254 against snap post 220 as seen in FIG. 4B, and handle 254 can be securely locked to snap post 220.

Handle 254 can include one or more beams 260 that provide strength and support to scoop 252. Snap post 220 can be constructed and arranged to be snap-fitted over any one of beams 260.

It should be noted that the placement of the scoop 20 and the gripper 60 may vary in the dispensing apparatus 10 depending on design and engineering preference to accommodate various user preferences.

In an alternative embodiment, the present disclosure provides a method of dispensing a product. The method comprises providing a storage device including an overcap having a lid having an attachment mechanism attached to a portion of a surface of the lid and a scoop attached to the attachment mechanism, a rim hingedly attached to the lid and including a gripper constructed and arranged to hold the scoop, and a container attached to the rim of the overcap and holding a product.

The method further comprises opening the lid and removing the scoop from the attachment mechanism. The scoop can be used to remove product from the storage device. The scoop can be inserted into the gripper for easy access the next time the product needs to be removed and dispensed.

The lid and rim of the overcap, scoop and container can be made of any suitable material. For example, the lid and rim of the overcap, scoop and container can be made from a suitable polyethylene material, random copolymer, polypropylene copolymer and the like. The lid and rim of the overcap, scoop and container can be made of the same material as each other or each can be made of a separate material that matches the objections of that particular component.

It should be understood that various changes and modifications to the presently preferred embodiments described herein will be apparent to those skilled in the art: Such changes and modifications can be made without departing from the spirit and scope of the present subject matter and without diminishing its intended advantages. It is therefore intended that such changes and modifications be covered by the appended claims.

The invention is claimed as follows:

1. A dispensing apparatus, comprising:
an overcap comprising:
a lid having an attachment mechanism extending from an interior surface of the lid, the attachment mechanism configured to receive and support a scoop;
a rim hingedly attached to the lid so that the lid is movable relative to the rim between an open position and a closed position; and
a gripper extending from the rim and having a top, a bottom, and a pair of curved protrusions defining a C-shaped recess extending through the entire gripper from the top to the bottom in a way that the gripper is configured to receive the scoop, the gripper extending inwardly from the rim in a way that an entirety of the gripper is in a coplanar relationship relative to the rim such that an upper edge of the rim is free of the gripper so that the lid mates with the upper edge of the rim along the entire circumference of the rim when the lid is in the closed position.

2. The dispensing apparatus of claim 1, wherein the attachment mechanism comprises a first support member, a second support member and a snap peg positioned between the first support member and the second support member.

3. The dispensing apparatus of claim 1, wherein the attachment mechanism comprises a support member and a snap post.

4. The dispensing apparatus of claim 1, wherein the lid defines at least one raised curve member.

5. The dispensing apparatus of claim 1, wherein the rim is constructed and arranged to be attached to a container.

6. The dispensing apparatus of claim 1, wherein the lid comprises a first locking member and the rim comprises a second locking member that attaches to the first locking member.

7. A storage device for storing particulate material, the apparatus comprising:
a scoop comprising a cup and a handle attached to the cup;
an overcap comprising:
a lid having an attachment mechanism extending from an interior surface of the lid, the attachment mechanism configured to receive and support the scoop;
a rim hingedly attached to the lid so that the lid is movable relative to the rim between an open position and a closed position; and
a gripper extending from the rim and having a top, a bottom, and a pair of curved protrusions defining a C-shaped recess extending through the entire gripper from the top to the bottom in a way that the gripper is configured to receive the scoop, the gripper extending inwardly from the rim in a way that an entirety of the gripper is in a coplanar relationship relative to the rim such that an upper edge of the rim is free of the gripper so that the lid mates with the upper edge of the rim along the entire circumference of the rim when the lid is in the closed position; and
a container coupled to the rim of the overcap,
wherein the scoop is supported by one of the attachment mechanism and the gripper.

8. The storage device of claim 7, wherein the attachment mechanism comprises a first support member, a second support member and a snap peg positioned between the first support member and the second support member.

9. The storage device of claim 7, wherein the attachment mechanism comprises a support member and a snap post.

10. The storage device of claim 7, wherein the lid defines at least one raised curve member.

11. The storage device of claim 7, wherein the lid comprises a first locking member and the rim comprises a second locking member that attaches to the first locking member.

12. The storage device of claim 7, wherein a portion of the handle comprises at least one guiding member.

13. The storage device of claim 7, wherein the container comprises a recessed gripping portion.

14. A method of dispensing a product, the method comprising:
providing a storage device as claimed in any one of claim 7-8, 11, or 13.

* * * * *